(12) United States Patent
Hafner (10) Patent No.: US 8,230,726 B2
(45) Date of Patent: Jul. 31, 2012

(54) METHODS, SYSTEMS AND APPARATUS RELATING TO TIP CLEARANCE CALCULATIONS IN TURBINE ENGINES

(75) Inventor: Matthew Troy Hafner, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 331 days.

(21) Appl. No.: 12/751,378

(22) Filed: Mar. 31, 2010

(65) Prior Publication Data

US 2011/0243708 A1  Oct. 6, 2011

(51) Int. Cl.
*G01M 15/14* (2006.01)
(52) U.S. Cl. .................................................. 73/112.01
(58) Field of Classification Search .............. 73/112.01, 73/112.02, 112.03, 112.05
See application file for complete search history.

(56) References Cited

U.S. PATENT DOCUMENTS

| | | | |
|---|---|---|---|
| 4,049,349 A | 9/1977 | Wennerstrom | |
| 4,063,167 A * | 12/1977 | Duly | 324/671 |
| 4,304,093 A | 12/1981 | Schulze | |
| 4,330,234 A | 5/1982 | Colley | |
| 4,501,095 A | 2/1985 | Drinkuth et al. | |
| 4,806,848 A | 2/1989 | Demers | |
| 5,127,793 A | 7/1992 | Walker et al. | |
| 6,607,350 B2 | 8/2003 | Dodd | |
| 6,692,222 B2 | 2/2004 | Prinz et al. | |
| 6,717,418 B2 | 4/2004 | Orenstein | |
| 7,215,129 B1 | 5/2007 | Andarawis et al. | |
| 2003/0094956 A1* | 5/2003 | Orenstein | 324/644 |
| 2009/0090182 A1* | 4/2009 | Holmquist | 73/455 |
| 2009/0165540 A1* | 7/2009 | Craig | 73/112.01 |
| 2010/0043576 A1* | 2/2010 | Craig | 73/865.9 |
| 2010/0110450 A1* | 5/2010 | Corn et al. | 356/625 |
| 2012/0069355 A1* | 3/2012 | Hynous | 356/625 |

* cited by examiner

*Primary Examiner* — Eric S McCall
(74) *Attorney, Agent, or Firm* — Mark E. Henderson; Ernest G. Cusick; Frank A. Landgraff (57) ABSTRACT

A method of calculating the tip clearance during operation of a combustion turbine engine that includes the steps of: measuring a cold tip clearance and a cold shell-to-shell distance; while the combustion turbine engine is operating, measuring an operating parameter and measuring a shell-to-shell distance with a proximity sensor; calculating the tip clearance based on the cold tip clearance measurement and the operating parameter measurement; calculating the shell-to-shell distance based on the cold shell-to-shell distance measurement and the operating parameter measurement; comparing the shell-to-shell distance measurement of the proximity sensor with the shell-to-shell distance calculation; and calibrating the calculated tip clearance calculation based on the comparison.

20 Claims, 7 Drawing Sheets

METHODS, SYSTEMS AND APPARATUS RELATING TO TIP CLEARANCE CALCULATIONS IN TURBINE ENGINES

BACKGROUND OF THE INVENTION

This present application relates generally to methods, systems, and apparatus for clearance between a stationary component and a movable component of a rotating machine. More specifically, but not by way of limitation, the present application relates to methods, systems, and apparatus pertaining to measuring blade tip clearance between rotating turbine blades and surrounding stationary structures in combustion turbine engines, which, as used herein and unless specifically stated otherwise, is meant to include all types of turbine or rotary engines, including gas turbine engines, aircraft engines, steam turbine engines.

A gas turbine engine (which, as discussed below, may be used to illustrate an exemplary application of the current invention) includes a compressor, a combustor, and a turbine. The compressor and turbine generally include rows of blades that are axially stacked in stages. Each stage includes a row of circumferentially-spaced stator blades, which are fixed, and a row of rotor blades, which rotate about a central axis or shaft. In operation, generally, the compressor rotor blades rotate about the shaft, and, acting in concert with the stator blades, compress a flow of air. The supply of compressed air then is used in the combustor to combust a supply of fuel. Then, the resulting flow of hot expanding gases from the combustion, i.e., the working fluid, is expanded through the turbine section of the engine. The flow of working fluid through the turbine induces the rotor blades to rotate. The rotor blades are connected to a central shaft such that the rotation of the rotor blades rotates the shaft. In this manner, the energy contained in the fuel is converted into the mechanical energy of the rotating shaft, which, for example, may be used to rotate the rotor blades of the compressor, such that the supply of compressed air needed for combustion is produced, and the coils of a generator, such that electrical power is generated. During operation, because of the extreme temperatures of the hot-gas path, the velocity of the working fluid, and the rotational velocity of the engine, rotor blades become highly stressed with extreme mechanical and thermal loads.

One of ordinary skill in the art will appreciate that the efficiency of gas turbine engines is significantly impacted by clearance between the outer radial tip of the rotor blades and the surrounding stationary structure, which is referred to herein as "tip clearance". It will be appreciated that tighter clearances decrease the leakage flow around the rotor blades, which improves engine efficiency. Tighter tip clearances, though, increase the risk that rotating parts will make contact with or rub against non-rotating parts during one of the engine's several operational modes, particularly considering the fact that tip clearances generally vary based upon operating conditions. Primarily, this is due to the different thermal expansion characteristics of many of the engine components. Of course, having rotating and stationary parts rub or make contact during operation is highly undesirable because it can cause extensive damage to the engine or failure of certain components. In addition, rubbing may result in increased clearances once the event that caused the rubbing passes. On the other hand, the engine may be designed with looser clearances that decrease the likelihood of rubbing parts. However, this is undesirable because it generally allows for more leakage and, thereby, decreases the efficiency of the engine.

Many newer gas turbines employ active clearance control systems to manage the clearance during a myriad of operating conditions so that a tight, non-rubbing clearance is maintained. It will be appreciated that these systems need regular, updated, and accurate tip clearance data to realize the full benefit of the clearance control system. Conventional measurement systems measure tip clearance with proximity sensors positioned in the hot-gas path. Typically, these probes are positioned directly over the rotor blades and measure the distance between the probe and the blade tips of the rotor blades as the blades pass.

The downside of positioning the sensors in this manner is that the sensors are exposed to the extreme temperatures of the hot gas flowpath. Sensors that are able to withstand these conditions while providing accurate measurements are expensive. Even so, because of the extreme conditions of the hot-gas path, these sensors have short life spans, which increases costs and maintenance requirements. Also, these sensors typically require a supply of cooling air, which may be bled from the compressor or supplied from an auxiliary source. It will be appreciated that providing cooling air in this manner adds complexity to engine systems and, because the air supplied for cooling purposes reduces the supply of air that may be used for combustion, decreases the efficiency of the engine.

As a result, there is a need for improved apparatus, methods and systems relating to the cost-effective systems that accurately calculate and monitor tip clearances in turbine engines.

BRIEF DESCRIPTION OF THE INVENTION

In a combustion turbine engine that includes an inner turbine shell and an outer turbine shell, and a row of rotor blades having blade tips and surrounding stationary structure that surrounds the row of rotor blades at a position just outboard of the blade tips thereby defining a tip clearance between the blade tips and the surrounding stationary structure, the present application describes a method of calculating the tip clearance during operation of the combustion turbine engine. The method may include the following steps: measuring a cold tip clearance and a cold shell-to-shell distance while the combustion turbine engine is not operating; while the combustion turbine engine is operating, measuring an operating parameter; while the combustion turbine engine is operating, measuring a shell-to-shell distance with a proximity sensor; calculating the tip clearance based on the cold tip clearance measurement and the operating parameter measurement; calculating the shell-to-shell distance based on the cold shell-to-shell distance measurement and the operating parameter measurement; comparing the shell-to-shell distance measurement of the proximity sensor with the shell-to-shell distance calculation; and calibrating the calculated tip clearance calculation based on the comparison between shell-to-shell distance measurement of the proximity sensor and the shell-to-shell distance calculation.

In one or more combustion turbine engines that each include an inner turbine shell and an outer turbine shell, and a row of rotor blades that includes at least one rotor blade having blade tips and surrounding stationary structure that surrounds the row of rotor blades at a position just outboard of the blade tips such that a tip clearance is defined between the blade tips and the surrounding stationary structure, the present application further describes another method of calculating the tip clearance during operation of the combustion turbine engine. This method may include the following steps: positioning a first proximity sensor within the hot-gas path of a first combustion turbine engine in a predetermined location so that the first proximity sensor measures the tip clearance; positioning a second proximity sensor in a predetermined location outside of the hot-gas path of the first combustion turbine engine so that the second proximity sensor measures a shell-to-shell distance defined between the inner turbine shell and the outer turbine shell; in the first combustion turbine engine, while the first combustion turbine engine is operating, measuring the tip clearance with the first proximity sensor and recording the tip clearance measurements; in the first combustion turbine engine, while the first combustion turbine engine is operating, measuring the shell-to-shell distance with the second proximity sensor and recording the shell-to-shell distance measurements; based on the recorded tip clearance measurements and the recorded shell-to-shell measurements, developing a correlation between the shell-to-shell distance measurements and the tip clearance measurements in the first combustion turbine engine; and using the correlation to calculate the tip clearance based upon the shell-to-shell distance measurements in the one or more combustion turbine engines.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

As an initial matter, to communicate clearly the invention of the current application, it may be necessary to select terminology that refers to and describes certain parts or machine components of a turbine engine and related systems. Whenever possible, industry terminology will be used and employed in a manner consistent with its accepted meaning. However, it is meant that any such terminology be given a broad meaning and not narrowly construed such that the meaning intended herein and the scope of the appended claims is unreasonably restricted. Those of ordinary skill in the art will appreciate that often a particular component may be referred to using several different terms. In addition, what may be described herein as a single part may include and be referenced in another context as consisting of several component parts, or, what may be described herein as including multiple component parts may be fashioned into and, in some cases, referred to as a single part. As such, in understanding the scope of the invention described herein, attention should not only be paid to the terminology and description provided, but also to the structure, configuration, function, and/or usage of the component, as provided herein.

In addition, several descriptive terms may be used regularly herein, and it may be helpful to define these terms at this point. These terms and their definition given their usage herein is as follows. The term "rotor blade", without further specificity, is a reference to the rotating blades of either the compressor or the turbine, which include both compressor rotor blades and turbine rotor blades. The term "stator blade", without further specificity, is a reference the stationary blades of either the compressor or the turbine, which include both compressor stator blades and turbine stator blades. The term "blades" will be used herein to refer to either type of blade. Thus, without further specificity, the term "blades" is inclusive to all type of turbine engine blades, including compressor rotor blades, compressor stator blades, turbine rotor blades, and turbine stator blades. Further, as used herein, "downstream" and "upstream", as well as "forward" and "aft", are terms that indicate a direction relative to the flow of working fluid through the turbine. As such, the term "downstream" refers to a direction that generally corresponds to the direction of the flow of working fluid, and the term "upstream" or "forward" generally refers to the direction that is opposite of the direction of flow of working fluid. The terms "trailing" or "aft" and "leading" or "forward" generally refer to relative position in relation to the flow of working fluid. At times, which will be clear given the description, the terms "trailing" and "leading" may refer to the direction of rotation for rotating parts. When this is the case, the "leading edge" of a rotating part is the front or forward edge given the direction that the part is rotating and, the "trailing edge" of a rotating part is the aft or rearward edge given the direction that the part is rotating.

The term "radial" refers to movement or position perpendicular to an axis. It is often required to described parts that are at differing radial positions with regard to an axis. In this case, if a first component resides closer to the axis than a second component, it may be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis.

Figure 1:
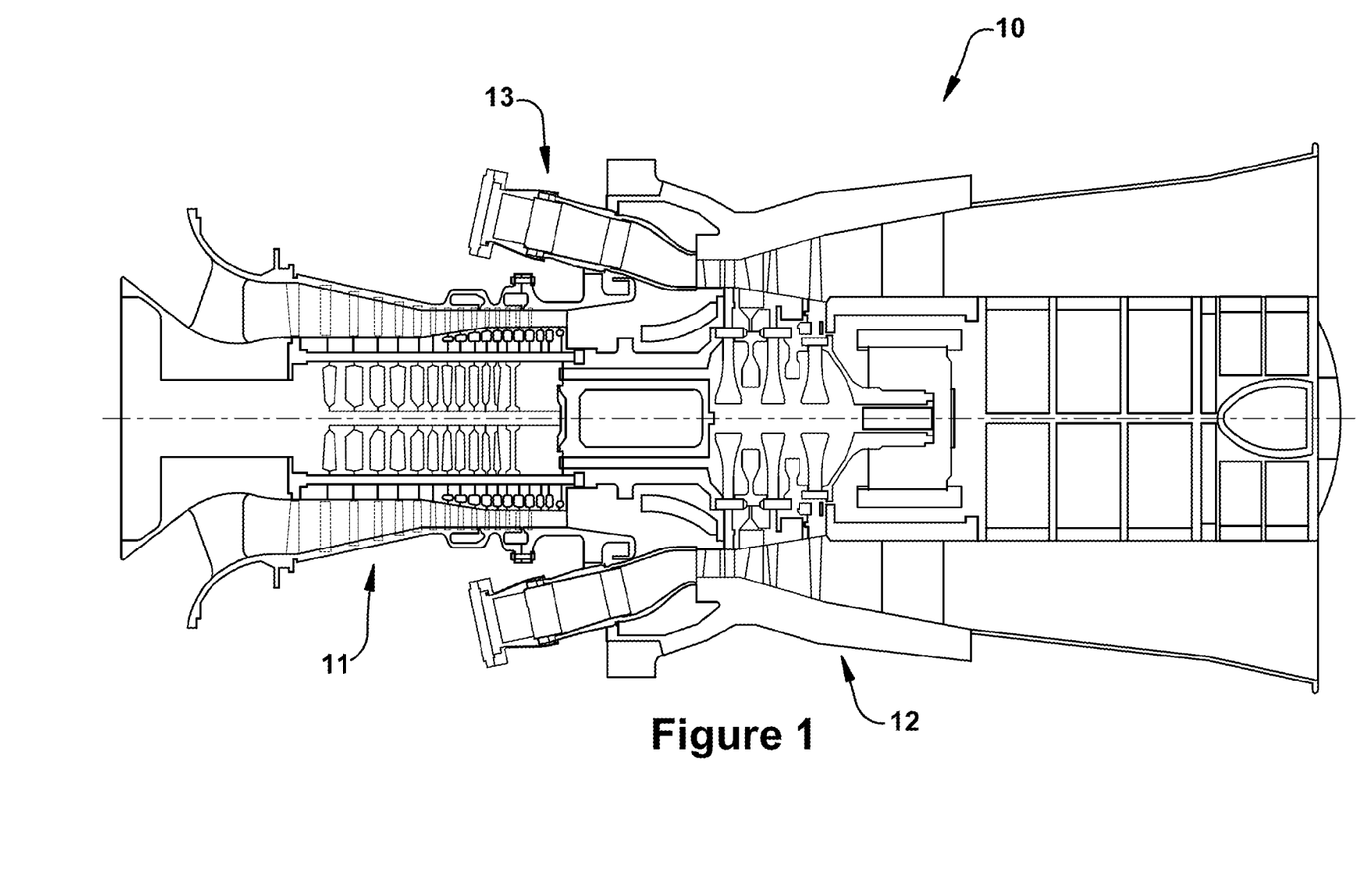
FIG. 1 is a schematic representation of an exemplary turbine engine in which certain embodiments of the present application may be used.
Figure 2:
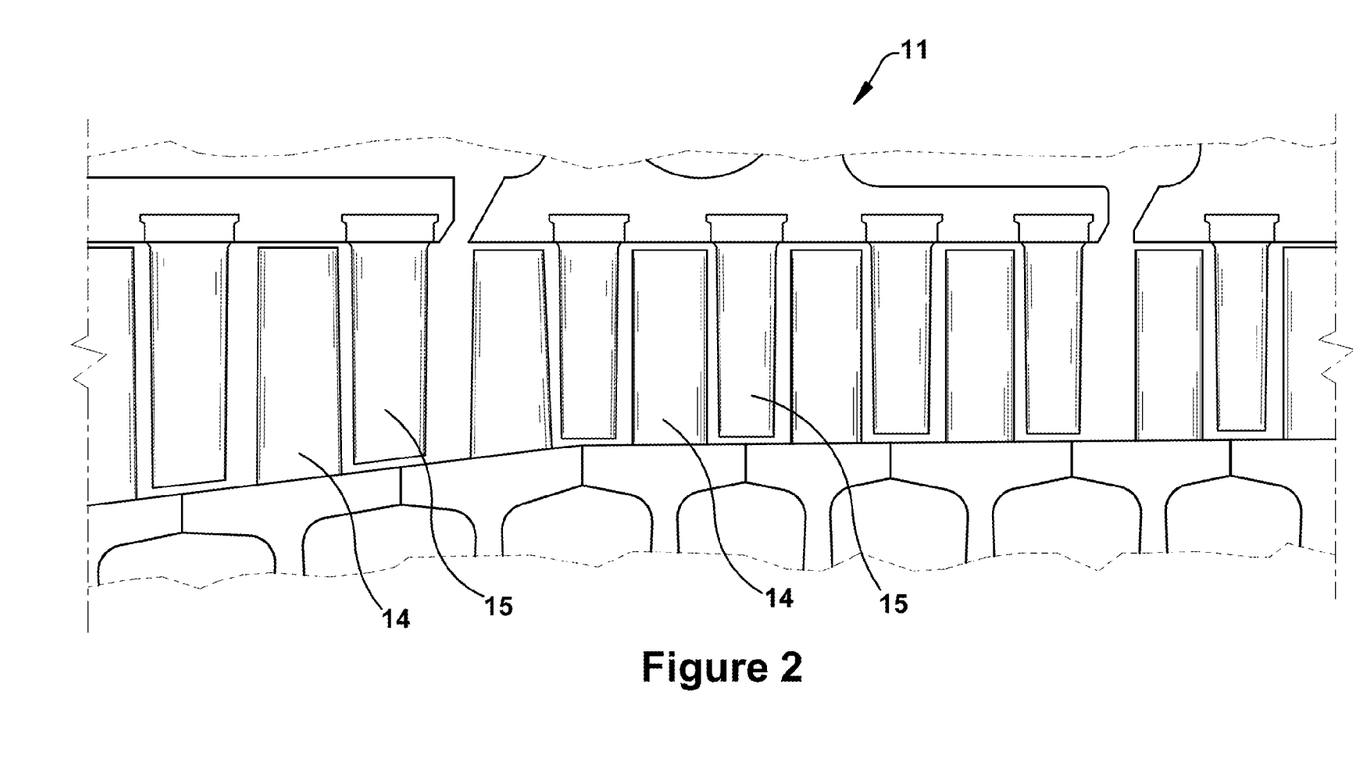
FIG. 2 is a sectional view of the compressor section of the gas turbine engine of FIG. 1.
Figure 3:
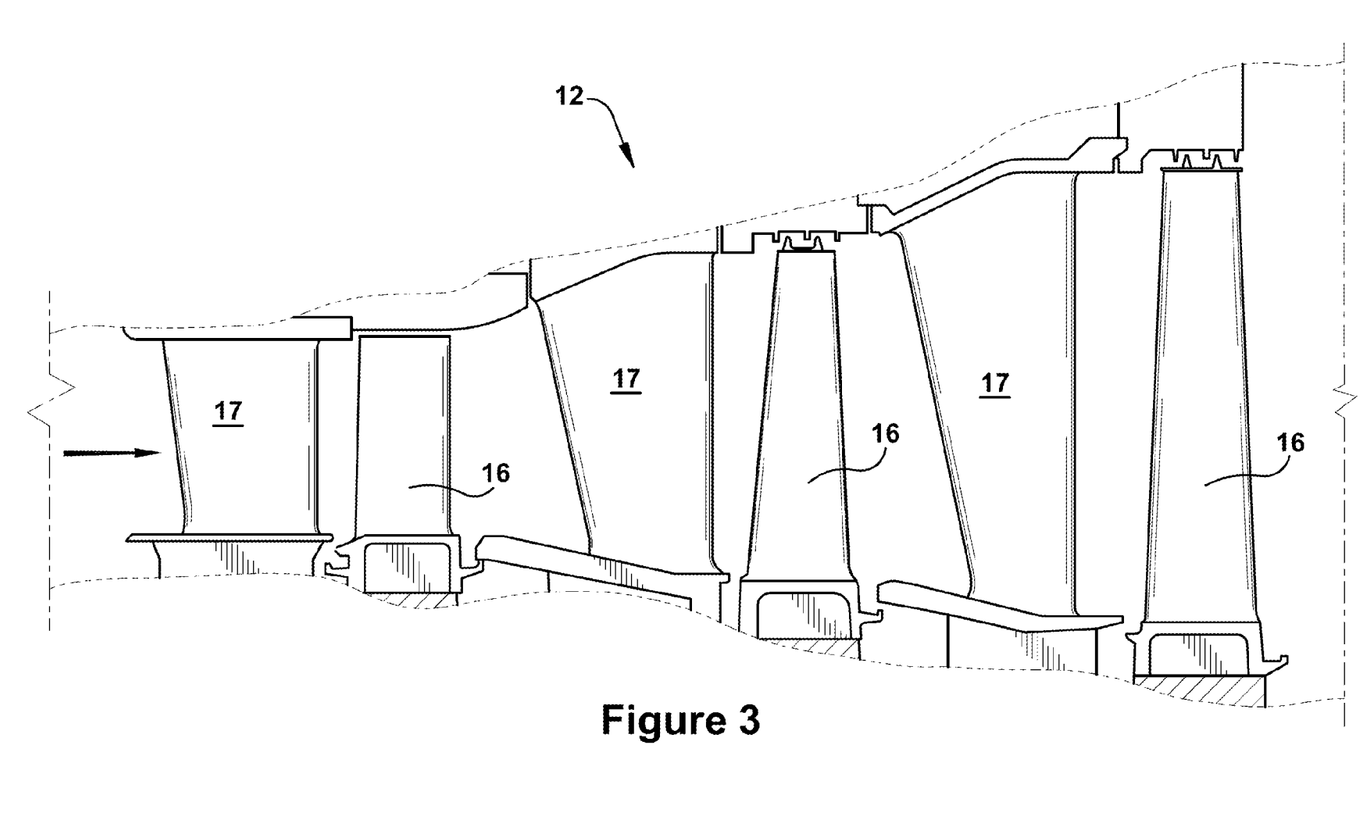
FIG. 3 is a sectional view of the turbine section of the gas turbine engine of FIG. 1.

By way of background, referring now to the figures, FIGS. 1 through 3 illustrate an exemplary gas turbine engine in which embodiments of the present application may be used. It will be understood by those skilled in the art that the present invention is not limited to this type of usage. As stated, the present invention may be used in gas turbine engines, such as the engines used in power generation and airplanes, steam turbine engines, and other type of rotary engines. FIG. 1 is a schematic representation of a gas turbine engine 10. In general, gas turbine engines operate by extracting energy from a pressurized flow of hot gas produced by the combustion of a fuel in a stream of compressed air. As illustrated in FIG. 1, gas turbine engine 10 may be configured with an axial compressor 11 that is mechanically coupled by a common shaft or rotor to a downstream turbine section or turbine 11, and a combustor 13 positioned between the compressor 11 and the turbine 12.

FIG. 2 illustrates a view of an exemplary multi-staged axial compressor 11 that may be used in the gas turbine engine of FIG. 1. As shown, the compressor 11 may include a plurality of stages. Each stage may include a row of compressor rotor blades 14 followed by a row of compressor stator blades 15. Thus, a first stage may include a row of compressor rotor blades 14, which rotate about a central shaft, followed by a row of compressor stator blades 15, which remain stationary during operation. The compressor stator blades 15 generally are circumferentially spaced one from the other and fixed about the axis of rotation. The compressor rotor blades 14 are circumferentially spaced and attached to the shaft; when the shaft rotates during operation, the compressor rotor blades 14 rotate about it. As one of ordinary skill in the art will appreciate, the compressor rotor blades 14 are configured such that, when spun about the shaft, they impart kinetic energy to the air or fluid flowing through the compressor 11. The compressor 11 may have other stages beyond the stages that are illustrated in FIG. 2. Additional stages may include a plurality of circumferential spaced compressor rotor blades 14 followed by a plurality of circumferentially spaced compressor stator blades 15.

FIG. 3 illustrates a partial view of an exemplary turbine section or turbine 11 that may be used in the gas turbine engine of FIG. 1. The turbine 11 also may include a plurality of stages. Three exemplary stages are illustrated, but more or less stages may present in the turbine 11. A first stage includes a plurality of turbine buckets or turbine rotor blades 16, which rotate about the shaft during operation, and a plurality of nozzles or turbine stator blades 17, which remain stationary during operation. The turbine stator blades 17 generally are circumferentially spaced one from the other and fixed about the axis of rotation. The turbine rotor blades 16 may be mounted on a turbine wheel (not shown) for rotation about the shaft (not shown). A second stage of the turbine 11 also is illustrated. The second stage similarly includes a plurality of circumferentially spaced turbine stator blades 17 followed by a plurality of circumferentially spaced turbine rotor blades 16, which are also mounted on a turbine wheel for rotation. A third stage also is illustrated, and similarly includes a plurality of turbine stator blades 17 and rotor blades 16. It will be appreciated that the turbine stator blades 17 and turbine rotor blades 16 lie in the hot-gas path of the turbine 11. The direction of flow of the hot gases through the hot-gas path is indicated by the arrow. As one of ordinary skill in the art will appreciate, the turbine 11 may have other stages beyond the stages that are illustrated in FIG. 3. Each additional stage may include a row of turbine stator blades 17 followed by a row of turbine rotor blades 16.

In use, the rotation of compressor rotor blades 14 within the axial compressor 11 may compress a flow of air. In the combustor 13, energy may be released when the compressed air is mixed with a fuel and ignited. The resulting flow of hot gases from the combustor 13, which may be referred to as the working fluid, is then directed over the turbine rotor blades 16, the flow of working fluid inducing the rotation of the turbine rotor blades 16 about the shaft. Thereby, the energy of the flow of working fluid is transformed into the mechanical energy of the rotating blades and, because of the connection between the rotor blades and the shaft, the rotating shaft. The mechanical energy of the shaft may then be used to drive the rotation of the compressor rotor blades 14, such that the necessary supply of compressed air is produced, and also, for example, a generator to produce electricity.

Figure 4:
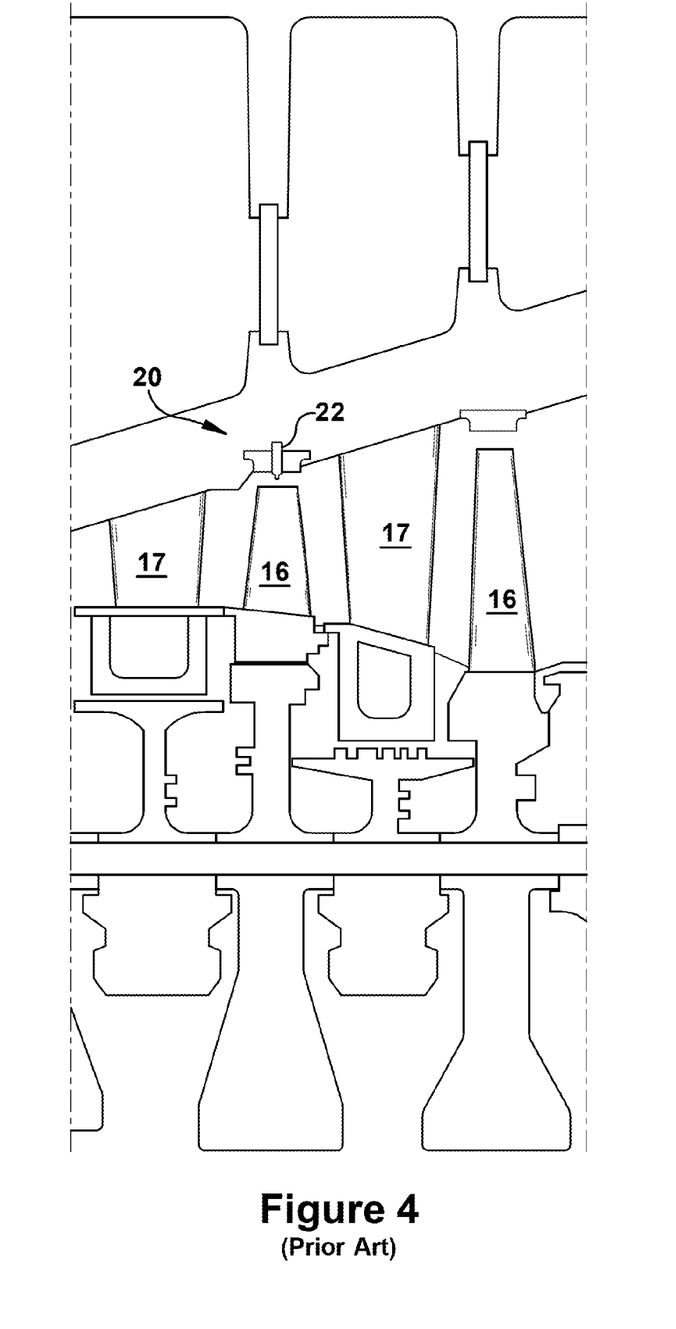
FIG. 4 is a schematic illustration of a tip clearance system according to conventional design.

FIG. 4 illustrates a tip clearance system 20 in accordance with conventional design that may be used to determine tip clearance as the turbine engine operates. The system 20 may include one or more conventional proximity sensors 22 spaced around the circumference of a stage of turbine rotor blades 16. Specifically, the proximity sensors 22 may be mounted in the stationary structure that surrounds the rotor blades 16 from an outboard position. In this manner, the proximity sensor 22 may be positioned so that it faces a stage of turbine rotor blades 16 from an outwardly radial position. From this position, the proximity sensors 22 may measure the distance from the proximity sensor 22 to the outboard tip of the turbine rotor blade 16, which generally indicates the clearance between the rotating parts (i.e., the rotor blades 16) and the stationary structure that surrounds them.

In use, the system 20 of FIG. 4 may take regular measurements so that the distance between the outer radial tip of the turbine blade 16 and the stationary structure may be known or calculated. The data related to these measurements may be sent to an active clearance control system (not shown) where it might be used to control or manipulate the blade tip clearance in a performance enhancing manner. That is, given the measurements taken by the proximity sensors 22, the clearance control system may manage the clearance during a myriad of operating conditions so that a tight, non-rubbing clearance is maintained. It will be appreciated that clearance control system of this nature need regular, accurate tip clearance measurements to realize the full benefit of their usage.

The downside of positioning the proximity sensors 22 in this manner is that the proximity sensors 22 are exposed to the high temperatures of the hot gas flowpath. Sensors that are able to withstand these conditions while providing accurate measurements are expensive. Even so, because of the extreme conditions of the hot-gas path, these sensors typically have short life spans, which increases costs and maintenance requirements. To increase the life span of the sensors, a supply of cooling air may be provided to them to keep them cool. This air might be provided from the compressor or from some auxiliary source. It will be appreciated that providing cooling air to the sensors adds complexity to the systems of the engine and, because the air supplied for cooling purposes reduces the supply of air that may be used for combustion requires the operation of some auxiliary source, its usage decreases the efficiency of the engine.

Figure 5:
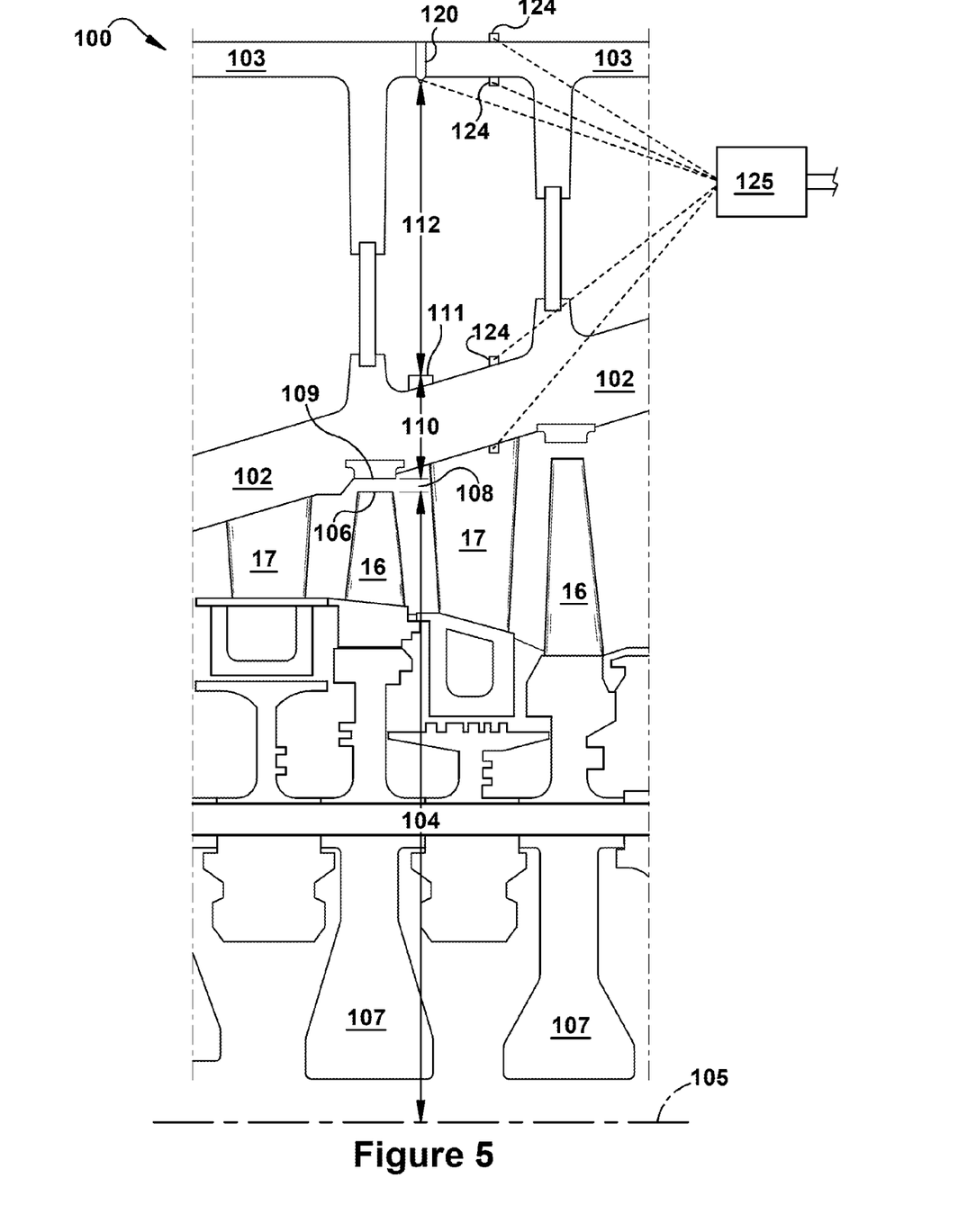
FIG. 5 is a schematic illustration of a tip clearance system according to an exemplary embodiment of the present application.

FIG. 5 illustrates a tip clearance system 100 according to an embodiment of the present invention that may be used to determine tip clearance as the turbine engine operates. The tip clearance system 100 is shown as it may be employed in a turbine of an exemplary combustion turbine engine, which is shown in a partial cross-sectional view. It will be appreciated that the tip clearance system 100 may also be used in turbine engines having different configurations and/or components. The tip clearance system 100 may be used with a turbine architecture that includes at least an inner turbine shell 102 and an outer turbine shell 103.

As indicated, FIG. 5 references several dimensions, which may be helpful in describing the operation of the system 100. The first dimension is referred to herein and referenced in FIG. 5 as "blade tip height 104". This dimension represents the distance from the center axis 105 of the turbine to the outer radial tip of the turbine rotor blade 14, which is referred to herein as the "blade tip 106". It will be appreciated that blade tip height 104 typically is made up of the radius of a turbine wheel 107 (into which the turbine rotor blades 16 mount) and the radial height of the rotor blade 14 (i.e., the extent to which the rotor blade 14 extends beyond the turbine wheel 107).

The second dimension is referred to herein and referenced in FIG. 5 as "tip clearance 108". As stated above, tip clearance 108 is the distance between the blade tip 106 the stationary structure that surrounds the blade tip 106. The stationary structure that surrounds the blade tip 106 is referred to herein and referenced on FIG. 5 as "surrounding stationary structure 109", and is intended to include any stationary component or structure that resides closest to the blade tip 106 from a position that is just outboard of the blade tip 106. As shown in FIG. 5, the surrounding stationary structure 109 may comprise a stationary shroud. Accordingly, in the configuration shown in FIG. 5, tip clearance 108 is the distance between the blade tip 106 and the stationary shroud.

It will be appreciated that the tip clearance 108 between stationary and rotating components forms a leakage path and that, generally, the blade tip 106 and the surrounding stationary structure 109 are configured to together form a seal that discourages leakage through this channel. Because several different sealing strategies exist for sealing this channel, the blade tip 106 and the surrounding structure 109 may take many forms. As such, it will be appreciated that many types of components or structure may be present at the blade tip 106 and the surrounding stationary structure 109. For example, in some cases, the rotor blade 16 may have a tip shroud (not shown). In this case, an outermost region of the tip shroud, which, in many cases would be a cutter tooth, would form the blade tip 106. The outer flowpath seal may include a stationary shroud that includes abradable material into which the cutter tooth cuts and, thereby, forms a seal. It will be appreciated that the present invention is not limited to any particular blade tip 106/surrounding stationary structure 109 assembly and may be used with any of those described or shown in FIG. 5, as well as other structural configurations. In many cases, tip clearance 108 is the minimum distance that exists between the blade tip 106 and the surrounding stationary structure 109. Tip clearance 108 also may be described as the distance that the blade tip 106 and the surrounding stationary structure 109 must move toward each other before undesirable rubbing occurs between rotating and stationary parts.

The third dimension is referred to herein and referenced in FIG. 5 as an inner shell thickness 110. The inner shell thickness 110, as the name implies, is the thickness of the inner turbine shell 102. As shown, the inner shell thickness 110 typically comprises the distance between: a) the inner radial boundary of the surrounding stationary structure 109; and b) a target surface 111 on an outer radial surface of the inner turbine shell 102. Depending on the particular configuration of the surrounding stationary structure 109, the inner shell thickness 110 may include the thickness of a stationary shroud, as depicted in the exemplary configuration of FIG. 5. The target surface 111, as discussed in more detail below, may be any outer surface on the inner turbine shell 102 (or outer radial surface of a component attached to the inner turbine shell 102) against which a proximity sensor 120 may be trained. In one embodiment, as shown in FIG. 5, the target surface 111 may include a flat surface that is aligned in the axial direction (i.e., a surface that forms an angle of approximately 0° with a reference line extending in the axial direction from the same radial position). This type of target surface 111 may be preformed in the inner turbine shell 102 or machined into the inner turbine shell 102 so that it is integral to the inner turbine shell 102, or the target surface 111 may be an attached component that is configured to produce the desired configuration and/or have surface characteristics that promote accurate measurements by the proximity sensor 120. It will be appreciated that, because of the slight axial movement of the inner turbine shell 102 and outer turbine shell 103 relative to each other during operation, an axially aligned target surface 111 would improve the accuracy of the system, whereas a slanted surface may indicate that the inner turbine shell 102 and the outer turbine shell 103 have moved toward or away from each other when, in fact, it was axial movement that caused this result.

A fourth dimension is referred to herein and referenced in FIG. 5 as a shell-to-shell distance 112. The shell-to-shell distance 112 generally represents the distance between the outer shell 103 and the inner turbine shell 102. More particularly, as discussed in more detail below and as shown in FIG. 5, the shell-to-shell distance may represent the distance between a proximity sensor 120 that is rigidly mounted to the outer turbine shell 103 and the target surface 111 on the inner turbine shell 102.

One or more other components or instruments may be included in a system according to the present invention. As illustrated in FIG. 5, the system 100 may include one or more proximity sensors 120. The proximity sensors 120 may be rigidly mounted to the outer turbine shell 103. The proximity sensors 120 may be mounted through the shell 103 (as shown) or to the inner radial surface of the shell 103. In this manner, the proximity sensor 120 may be configured to aim toward the outer radial surface of the inner shell 102 and/or a target surface formed thereon. The proximity sensors 120 then may be aimed so that the sensor 120 measures the distance from the proximity sensor 120 to the inner shell 102, which, it will be appreciated, may be used to calculate any relative changes in the distance between the outer shell 103 and the inner shell 102 (i.e., the shell-to-shell distance 112). The proximity sensor 120 may comprise any type of proximity sensory that may be used to perform this function. In one preferred embodiment, the proximity sensor 120 is a laser proximity probe. In other embodiments, the proximity sensor 120 may be an eddy current sensor, capacitive sensor, microwave sensor, or any other similar type of device.

In some embodiments, a single proximity sensor 120 may be used. This proximity sensor 120, as shown in FIG. 5, may be located at an axial position that is in proximity to the axial position of a row of rotor blades 16. This single proximity sensor 120 then may be used as part of a system to calculate the tip clearance 108 for that particular row of rotor blades 16. It will be appreciated that other proximity sensors 120 may be present at axial positions that coincide with the other rows of rotor blades 16 so that they may be used in relation to the calculation of tip clearances 108 for these other rows of rotor blades 16. In other embodiments, a single proximity sensor 120 may be used in relation to a plurality of rows of rotor blades 16. This arrangement may result in a slight decrease in accuracy for the rows that are in positions that are further away from the axial position of the sensor 120.

In some embodiments, the tip clearance measuring system 100 may include multiple proximity sensors 120 that are spaced around the circumference of the turbine at the same approximate axial position. Placement in this manner may increase the accuracy of the system, particularly in larger turbines having a "half-shell" casing configuration. In these types of turbines, the shell structures are typically configured to have a bolted horizontal joint. As one of ordinary skill in the art will appreciate, because of this horizontal joint, thermal growth causes "ovalization". That is, the shell expands more along the horizontal joints so that the joined shells form a slight oval shape instead of staying circular. In this case, having a proximity sensor that monitors the shell-to-shell distance along the horizontal joint (or near the horizontal joint) and another proximity sensor monitoring the shell-to-shell distance at a position 90 degrees from the horizontal joint (or near this location) allows the ovalization to be accounted for. This may be significant considering the fact that the inner turbine shell heats (and thus "ovals") at a greater rate than the outer turbine shell during startup or other transient operational periods.

In addition, in one alternative embodiment, the proximity sensor 120 may be mounted to the inner shell 102 so that the sensor 120 measures the shell-to-shell distance 112 by measuring the distance between the location of the sensor 120 on the inner turbine shell 102 and a target surface 111 on the outer turbine shell 103. It will be appreciated that in either position, i.e., mounted to the outer shell 103 or to the inner shell 102, the proximity sensor 120 is not exposed to the harsh conditions of the hot-gas path. The proximity sensors 120, thus, would be exposed to much lower temperatures, which would allow the sensors to be constructed less expensively, extend the part-life of the sensor 120, and negate or reduce the usage of cooling air to cool the sensors 120.

In some embodiments, the tip clearance measuring system 100 may include one or more temperature sensors 124, which may be a thermocouple or other device. The temperature sensors 124 may be used to obtain data concerning the temperature of several components within the turbine engine in the area at which the tip clearance is being calculated and used in this calculation. For example, the temperature sensors 124 may be positioned to determine the temperature of the outer shell 103, which may include temperature measurements along one or both of the inner and outer radial surfaces of the outer shell 103, and the inner shell 102, which may include temperature measurements along one or both of the inner and outer radial surfaces of the inner shell 102. A temperature of the cavity between the inner turbine shell 102 and the outer turbine shell 103 also may be taken by one of the temperature sensors 124.

Through conventional means the proximity sensors 120 and/or the temperature sensors 124 may be configured so that they are connected to a control system 125. These connections are indicated by dashed lines in FIG. 5. The control system 125 may be a computer-implement device that communicates electronically to the several sensors and is configured to make calculations based on programmed instructions and logic and data it receives. For example, the control system 125 may be implemented as a single special purpose integrated circuit, such as ASIC, having a main or central processor section for overall, system-level control, and separate sections dedicated performing various different specific combinations, functions and other processes under control of the central processor section. It will be appreciated by those skilled in the art that the control system also may be implemented using a variety of separate dedicated or programmable integrated or other electronic circuits or devices, such as hardwired electronic or logic circuits including discrete element circuits or programmable logic devices, such as PLDs, PALs, PLAs or the like. The control system 125 also may be implemented using a suitably programmed general-purpose computer, such as a microprocessor or microcontroller, or other processor devices, such as a CPU or MPU, either alone or in conjunction with one or more peripheral data and signal processing devices.

In addition, as with many conventional computerized control systems used to monitor and control the operation of combustion turbine engines, the control system 125 may include computerized models and applications that make calculations related to a plurality of operating parameters. For example, the control system 125 may include programmed logic that calculates operating temperatures through the turbine 12 based on operating parameters such as load, ambient conditions, fuel characteristics, and others. The control system 125 also may include programmed models and logic that calculates the thermal growth of the wheel 107, the rotor blades 16, the thickness of the inner turbine shell 102, the thickness of the outer turbine shell 103, the diameter of the inner turbine shell 102, and/or the diameter of the outer turbine shell 103. These calculations may be based on measured temperatures or those temperatures calculated by the control system 125 based on other measured operating parameters and conditions, as one of ordinary skill in the art will appreciate.

The control system 125 and the several sensors 120, 124 may be configured to communicate electronically. It will be appreciated that, in certain embodiments, the control system 125 may receive, store and make calculations based on the proximity data and temperature data acquired from the proximity sensors 120 and the temperature sensors 124, respectively. The control system 125 also may be configured to operate in conjunction with a conventional active tip clearance control system, which may include the control of electro-mechanical systems that affect the tip clearance of rotor blades. In this manner, tip clearance 108 calculations of the present invention may be used by a conventional active tip clearance control system to manipulate tip clearance in a performance enhancing or desired manner.

In use, the tip clearance system 100 may be used accurately calculate tip clearance 108 data without incurring the expense of continually operating proximity sensors in the hot-gas path of the turbine. That is, the tip clearance system 100 may be used to accurately calculate tip clearance 108 data based on measurements made by proximity sensors 120 that reside outside of the hot-gas path of the turbine. The present invention takes advantage of the discovery that tip clearance variation can be more accurately calculated by measuring the changes that occur in the distance between the outer shell 103 and the inner shell 102. While measuring the tip clearance directly within the hot-gas path (as prior art systems teach) may yield slightly more accurate results, the present invention strikes a balance between accuracy and cost-effectiveness that makes it attractive and useful in many types of applications. That is, given the cost-savings the present invention provides (i.e., the use of less-expensive proximity sensors, longer proximity sensor part-life, the reduction or elimination of cooling air for the proximity sensors, etc.), the tip clearance measuring system according to the present invention often provides an attractive alternative to system administrators that are unwilling to pay the relatively high costs of operating proximity sensors in the hot-gas path.

Figure 6:
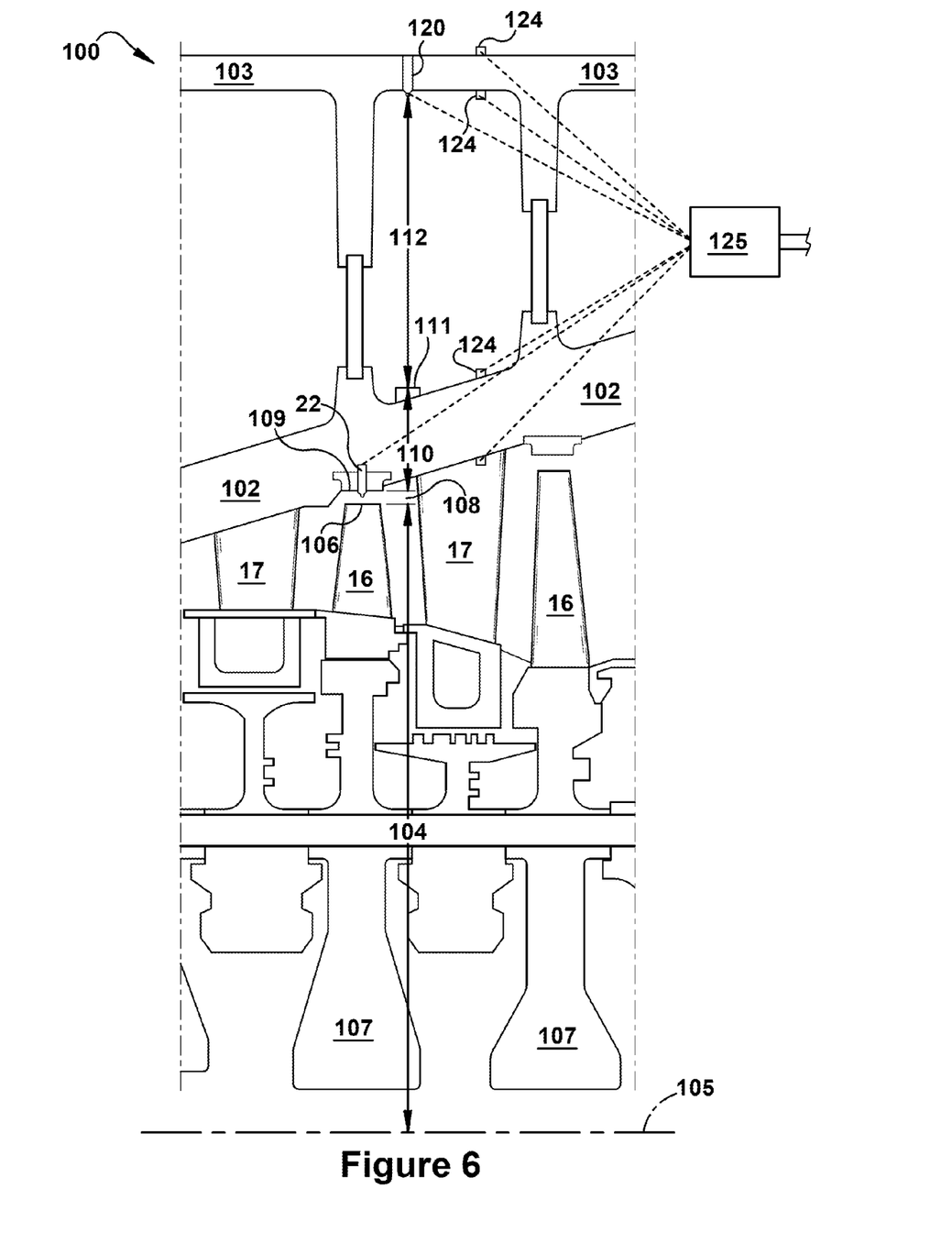
FIG. 6 is a schematic illustration of a tip clearance system according to an alternative embodiment of the present application.

FIG. 6 provides an alternative embodiment of the present invention. As shown, FIG. 6 includes a proximity sensor 22 in the hot-gas path and a proximity sensor 120 mounted to the outer turbine shell 103, both of which may be configured and operate as described above. The operation for this combined system is provided below in the discussion related to FIG. 8.

Figure 7:
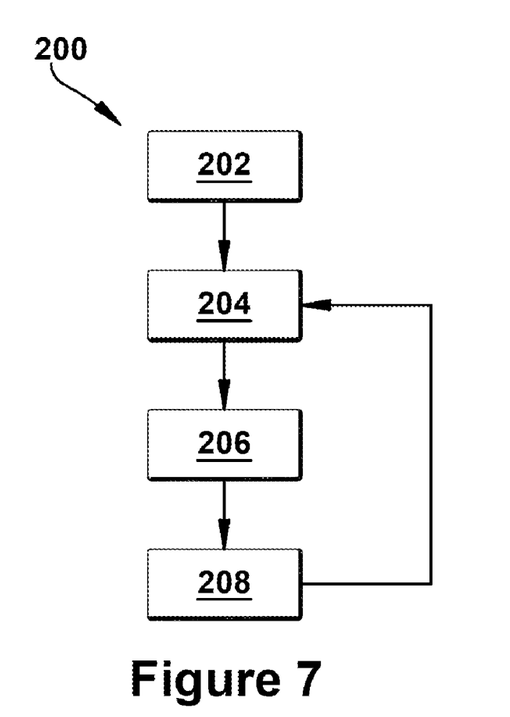
FIG. 7 is a logic flow diagram in accordance with an exemplary embodiment of the present application.
Figure 8:
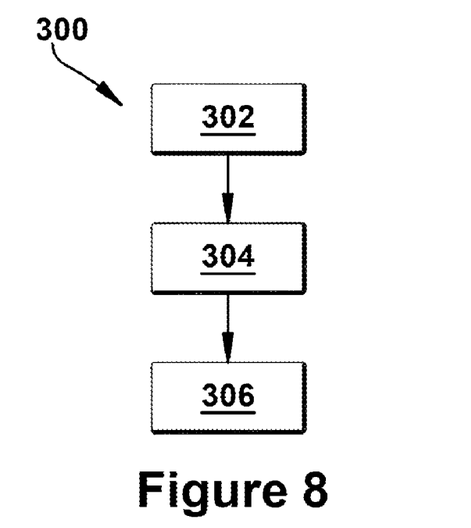
FIG. 8 is a logic flow diagram in accordance with an alternative embodiment of the present application.

The operation of two different embodiments of the present invention is described in relation to the logic flow diagrams of FIGS. 7 and 8. Referring to FIG. 7, process 200 may begin at block 202. At this initial step, "cold" (i.e., non-operating and static) measurements of relevant dimensions may be taken. It will be appreciated that this step is generally already undertaken during conventional turbine assembly and maintenance routines. These measurements may include: a cold-measured blade tip height 104, a cold-measured tip clearance 108, a cold-measured inner shell thickness 110, and a cold-measured shell-to-shell distance 112. The measurement of these cold dimensions may be taken once and used thereafter for an extended period. The measurement of the cold dimensions also may be updated regularly whenever the turbine engine is not operating, which may improve the accuracy of the method.

From block 202, the process may proceed to a block 204. At this step, the control system 125 may monitor several operating parameters of the turbine engine while it operates. These operating parameters may include any measurements made by any of the various system sensors, which may include the proximity sensor 120, the temperature sensors 124 as well as others. Other operating parameters that may be measured and monitored by the system may include, for example, load level, ambient conditions, shell-to-shell distance, hot-gas path temperatures, inner turbine shell temperatures, outer turbine shell temperatures, fuel conditions, pressure levels, and others.

From block 204, the process may proceed to a block 206. At this step, the process may calculate other turbine engine operating parameters based upon the measured parameters from block 204. For example, temperature levels through the turbine may be approximated or calculated using conventional turbine operating programs and models, as described above, which have been developed using known formulations, physical laws, material properties, historical data of combustion turbine engine operation, and other relevant information, as one of ordinary skill in the art will appreciate. For instance, using these conventional programs and models and the measured or known engine operating parameters, a change in the blade tip height 104 may be calculated. Such a calculation is typically based on the thermal growth of the wheel 107 and the rotor blade 16 that is known to result from the current and recent temperature levels through the hot-gas path (i.e., the current and recent temperatures experienced by the turbine wheel 107 and the turbine rotor blades 16). In the same way, using actual temperature data or temperature data based upon calculations made given other measured turbine operating characteristics, the thermal growth of the inner shell thickness 110, the thermal growth of the diameter of the inner turbine shell 102, the thermal growth of the thickness of the outer turbine shell 103, and the thermal growth of the diameter of the outer turbine shell 103 also may be calculated at step 206. It will be appreciated that thermal growth may be calculated using conventional methods. In one such method, a material property related to thermal growth includes a multiplier that when multiplied by the degrees change in temperature, provides the distance of thermal growth for the particular component.

From block 206, the process may proceed to a block 208. At this step, the process may calculate the current tip clearance 108. It will be appreciated that, in conventional systems, this calculation may be made given the measured cold dimensions and the calculated thermal growth characteristics given measured and/or calculated temperature data. In conventional systems, this type of tip clearance 108 calculation is as accurate as possible without the placement of proximity sensors in the hot-gas path and the direct measurement of the tip clearance 108 during engine operation. However, in the present invention, according to one embodiment, the tip clearance 108 calculation may be made while removing one of the most significant components of variation in the calculation and replacing this component with a real-time measurement. More particularly, the proximity sensor 120 is used to provide a current and very accurate measurement of the shell-to-shell distance 112, which, of course, indicates precisely the change in position of the inner turbine shell 102 in relation to that of the outer turbine shell 103. In this manner, what before had to be approximated using turbine engine models is directly and accurately measured, which, it will be appreciated, may be used to calibrate or increase the accuracy of tip clearance calculations.

In one embodiment, the tip clearance calculations made at block 208 are calibrated given the predicted shell-to-shell distance 112 and the measured shell-to-shell distance 112. That is, the predicted change in the inner turbine shell 102 in relation to the outer turbine shell 103 (i.e., that predicted using conventional systems) is calibrated given the actual measurement of the distance by the proximity sensor 120 on the outer turbine shell 103. It will be appreciated that this calibration (which removes a significant level of uncertainty to the process) may improve the accuracy of the ultimate tip clearance 108 calculation. Having calculated the tip clearance 108, the process may return to block 204 and cycle through the process again. In some embodiments (not shown), the process may report the calculated tip clearance 108 to a conventional active tip clearance control system.

Referring now to FIG. 8, logic diagram 300 is provided, which describes an alternative embodiment of the present application. This method uses the combined system shown in FIG. 6, i.e., a system that combines a proximity sensor 22 that is positioned in the hot-gas path to measure tip clearance 108 directly (as described in relation to FIG. 4) with a proximity sensor 120 that is positioned to measure shell-to-shell distance 112 (as described in relation to FIG. 5). As described below, a system of this nature may be used to develop or derive a correlation between measured tip clearance 108 data and measured shell-to-shell distance 112 data. This correlation data may be developed in a single engine and then applied to similarly designed engines. In this manner, much of the improved accuracy related to having a hot-gas path situated proximity sensor may be applied to a large number of engines, while the costs of operating hot-gas path sensors are incurred in only a single engine. As stated above, the discovery that there is a strong correlation between the changes in the shell-to-shell distance 112 and changes in tip clearance 108 make this method possible.

The process 300 may begin at a block 302. At this initial step, in a turbine engine having both a hot-gas path proximity sensor 22 to measure directly the tip clearance 108 and a proximity sensor 120 to measure the shell-to-shell distance 112, is operated and data is collected. This may include monitoring all types of operation parameters, such as those listed above, as well as, recording the measurements taken by each of the proximity sensors 22, 120. This may also include taking "cold" measurements of the relevant dimensions, as described above. From block 302, the process may continue to a block 304.

At block 304, the process may determine a correlation between the measured shell-to-shell distances 112 and the measured tip clearance 108 distances. As part of this, the process may identify how different operating conditions may affect this correlation. It will be appreciated that the accuracy of this correlation may be improved by recording greater amounts of operational data covering the range of operating conditions, as well as, by gathering correlation data on more than one or several turbine engines having similar or substantially identical design.

At block 306, the process may apply the correlation developed at block 304 to the turbine engine one which it was gathered or one or more other turbine engines to calculate tip clearance 108 during operation based on measured shell-to-shell distance 112. In the case of using the correlation on the same turbine on which it was gathered, it will be appreciated that this may be useful in that highly accurate results would be possible without continued reliance on the operation of the proximity sensor 22 in the hot-gas path. Thus, once the hot-gas path proximity sensor 22 ceased to function, accurate tip clearance data still could be generated using shell-to-shell 112 measurements without the need of incurring costs replacing the proximity sensor 22 in the hot-gas path. If desired, the proximity sensor 22 in the hot-gas path could be replaced or reactivated periodically and the correlation data updated so that the accuracy of the system remained high. The correlation developed at block 304 also may be applied to the operation of other turbines engines. For greater accuracy, these turbines should have designs that are similar. For greatest accuracy, these turbines should have designs that are substantially identical.

It will be appreciated that the process discussed in relation to FIGS. 7 and 8 may be combined in whole or in part such that a control system operates a combined system that has elements of each. In this manner, the system may include calculate tip clearance 108 during operation based upon: 1) conventional models and programs that calculate certain operating parameters and the measured shell-to-shell distance 112; and 2) the correlated data between tip clearance 108 and shell-to-shell distance developed on a similar or identical engine.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

I claim:

1. In a combustion turbine engine that includes an inner turbine shell and an outer turbine shell, and a row of rotor blades having blade tips and surrounding stationary structure that surrounds the row of rotor blades at a position just outboard of the blade tips thereby defining a tip clearance between the blade tips and the surrounding stationary structure, a method of calculating the tip clearance during operation of the combustion turbine engine, the method comprising the steps of:

measuring a cold tip clearance and a cold shell-to-shell distance while the combustion turbine engine is not operating;

while the combustion turbine engine is operating, measuring an operating parameter;

while the combustion turbine engine is operating, measuring a shell-to-shell distance with a proximity sensor;

calculating the tip clearance based on the cold tip clearance measurement and the operating parameter measurement;

calculating the shell-to-shell distance based on the cold shell-to-shell distance measurement and the operating parameter measurement;

comparing the shell-to-shell distance measurement of the proximity sensor with the shell-to-shell distance calculation; and calibrating the calculated tip clearance calculation based on the comparison between shell-to-shell distance measurement of the proximity sensor and the shell-to-shell distance calculation.

2. The method according to claim 1, wherein the operating parameter measurement and the shell-to-shell distance measurement approximately coincide in time.

3. The method according to claim 1, wherein the operating parameter measurement includes a plurality of operating parameter measurements; and the plurality of operating parameter measurements include operating parameter measurements over at least a plurality of different operating conditions of the combustion turbine engine.

4. The method according to claim 1, further comprising the step of positioning the proximity sensor in a predetermined location on the outer turbine shell and aiming the proximity sensor toward the inner turbine shell so that the proximity sensor measures the shell-to-shell distance;

wherein the shell-to-shell distance comprises the distance between the inner turbine shell and the outer turbine shell.

5. The method according to claim 4, further comprising the steps of:

forming a target surface on the inner turbine shell;

wherein the step of aiming the proximity sensor toward the inner turbine shell includes aiming the proximity sensor at the target surface; and wherein the target surface includes a substantially planar surface that is substantially aligned in the axial direction.

6. The method according to claim 4, wherein the measuring the cold tip clearance and the cold shell-to-shell distance includes measuring a blade tip height, an inner turbine shell diameter, and an outer turbine shell diameter.

7. The method according to claim 6, wherein the measuring an operating parameter comprises measuring a temperature at a plurality of predetermined locations within the combustion turbine engine; the predetermined locations including at least: one location relating to the temperature of the inner turbine shell; one location relating to the temperature of the outer turbine shell; and one location relating to the temperature of a rotor disc on which the rotor of rotor blades is mounted.

8. The method according to claim 6, further including the step of calculating an operating temperature at a plurality of predetermined locations within the combustion turbine engine based upon the measured operating parameter temperature; the predetermined locations including at least: one location relating to the temperature of the inner turbine shell; one location relating to the temperature of the outer turbine shell; one location relating to the temperature of a rotor disc on which the row of rotor blades is mounted; and one location relating to the temperature of the row of rotor blades;

wherein the step of calculating the tip clearance includes the steps of:

based on the temperature of the rotor disc, calculating a thermal growth of the rotor disc;

based on the temperature of the row of rotor blades calculation, calculating the thermal growth of the row of rotor blades; and based the temperature of the inner turbine shell calculation, calculating the thermal growth of the inner shell diameter;

wherein the step of calculating the shell-to-shell distance includes the step of:

based the temperature of the outer turbine shell calculation, calculating the thermal growth of the outer shell diameter.

9. The method according to claim 4, wherein the step of measuring the shell-to-shell distance with a proximity sensor while the combustion turbine engine is operating comprises measuring a shell-to-shell distance with at least two proximity sensors while the combustion turbine engine is operating; and wherein the at least two proximity sensors are spaced around the circumference of the outer turbine shell at approximately the same axial position; the circumferential spacing including an offset of approximately 90 degrees.

10. In one or more combustion turbine engines that each include an inner turbine shell and an outer turbine shell, and a row of rotor blades that includes at least one rotor blade having blade tips and surrounding stationary structure that surrounds the row of rotor blades at a position just outboard of the blade tips such that a tip clearance is defined between the blade tips and the surrounding stationary structure, a method of calculating the tip clearance during operation of the combustion turbine engine, the method comprising the steps of:

positioning a first proximity sensor within the hot-gas path of a first combustion turbine engine in a predetermined location so that the first proximity sensor measures the tip clearance;

positioning a second proximity sensor in a predetermined location outside of the hot-gas path of the first combustion turbine engine so that the second proximity sensor measures a shell-to-shell distance defined between the inner turbine shell and the outer turbine shell;

in the first combustion turbine engine, while the first combustion turbine engine is operating, measuring the tip clearance with the first proximity sensor and recording the tip clearance measurements;

in the first combustion turbine engine, while the first combustion turbine engine is operating, measuring the shell-to-shell distance with the second proximity sensor and recording the shell-to-shell distance measurements;

based on the recorded tip clearance measurements and the recorded shell-to-shell measurements, developing a correlation between the shell-to-shell distance measurements and the tip clearance measurements in the first combustion turbine engine; and using the correlation to calculate the tip clearance based upon the shell-to-shell distance measurements in the one or more combustion turbine engines.

11. The method according to claim 10, wherein:
the one or more combustion turbine engines comprise a single combustion turbine engine; and
the shell-to-shell distance measurements are used to calculate tip clearance based on the developed correlation when the first proximity sensor is not functioning.

12. The method according to claim 10, wherein:
the one or more combustion turbine engines comprise at least two combustion turbine engines, the first combustion turbine engine and a second combustion turbine engine;
further comprising the steps of:
positioning a third proximity sensor in a predetermined location outside of the hot-gas path of the second combustion turbine engine so that the third proximity sensor measures the shell-to-shell distance of the second combustion turbine engine;
in the second combustion turbine engine, while the second combustion turbine engine is operating, measuring the shell-to-shell distance with the third proximity sensor and recording the shell-to-shell distance measurements; and
using the correlation developed in the first combustion turbine engine to calculate the tip clearance in the second combustion turbine engine based upon the shell-to-shell distance measurements in the second combustion turbine engine.

13. The method according to claim 12, wherein the first combustion turbine engine and the second combustion turbine engine are substantially similar in design.

14. The method according to claim 13, wherein the first combustion turbine engine and the second combustion turbine engine are substantially identical in design.

15. The method according to claim 10, wherein:
the tip clearance measurements in the first combustion turbine engine substantially coincide in time with the shell-to-shell distance measurements in the first combustion turbine engine; and
the tip clearance measurements and the shell-to-shell measurements occur over at least a plurality of different operating conditions.

16. The method according to claim 10, wherein the positioning the second proximity sensor in the predetermined location outside of the hot-gas path of the first combustion turbine engine includes positioning at least two proximity sensors in two predetermined locations outside of the hot-gas path of the first combustion turbine engine; and
wherein the two predetermined locations comprises locations that are spaced around the circumference of the outer turbine shell at approximately the same axial position; the circumferential spacing of comprising an offset of approximately 90 degrees.

17. The method according to claim 12, further comprising the steps of:
positioning the second proximity sensor on the outer turbine shell and aiming the second proximity sensor toward the inner turbine shell;
positioning the third proximity sensor on the outer turbine shell and aiming the third proximity sensor toward the inner turbine shell.

18. The method according to claim 17, further comprising the steps of:
forming a target surface on the inner turbine shell of the first combustion turbine engine;
wherein the step of aiming the second proximity sensor toward the inner turbine shell includes aiming the second proximity sensor at the target surface;
wherein the target surface includes a substantially planar surface that is substantially aligned in the axial direction.

19. The method according to claim 17, further comprising the steps of:
forming a target surface on the inner turbine shell of the second combustion turbine engine;
wherein the step of aiming the third proximity sensor toward the inner turbine shell includes aiming the third proximity sensor at the target surface;
wherein the target surface includes a substantially planar surface that is substantially aligned in the axial direction.

20. The method according to claim 11, wherein the tip clearance measurements with the first proximity sensor and the measuring the shell-to-shell distance with the second proximity sensor approximately coincide in time.

* * * * *